US008638343B2

(12) United States Patent
Allyn et al.

(10) Patent No.: US 8,638,343 B2
(45) Date of Patent: Jan. 28, 2014

(54) DATA VISUALIZATION PLATFORM PERFORMANCE OPTIMIZATION

(75) Inventors: Barry Christopher Allyn, Snohomish, WA (US); Brian Scott Ruble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 12/433,288

(22) Filed: Apr. 30, 2009

(65) Prior Publication Data

US 2010/0277507 A1 Nov. 4, 2010

(51) Int. Cl.
*G09G 5/00* (2006.01)
*G06T 15/00* (2006.01)

(52) U.S. Cl.
USPC .......................................... 345/619; 345/418

(58) Field of Classification Search
USPC ........................................................ 345/619
See application file for complete search history.

(56) References Cited

U.S. PATENT DOCUMENTS

| | | | |
|---|---|---|---|
| 5,175,805 A | 12/1992 | Carrie | |
| 5,228,119 A | 7/1993 | Mihalisin et al. | |
| 5,461,708 A | 10/1995 | Kahn | |
| 5,581,677 A | 12/1996 | Myers et al. | |
| 5,859,958 A | 1/1999 | Chan et al. | |
| 5,936,641 A | 8/1999 | Jain et al. | |
| 5,982,399 A | 11/1999 | Scully et al. | |
| 6,023,279 A | 2/2000 | Sowizral et al. | |
| 6,052,125 A | 4/2000 | Gardiner et al. | |
| 6,243,172 B1 | 6/2001 | Gauthier et al. | |
| 6,466,211 B1 | 10/2002 | Havre et al. | |
| 6,523,074 B1 | 2/2003 | Dianda et al. | |
| 6,529,900 B1 | 3/2003 | Patterson et al. | |
| 6,747,650 B2 * | 6/2004 | Turner et al. | 345/473 |
| 7,068,267 B2 | 6/2006 | Meanor et al. | |
| 7,071,940 B2 | 7/2006 | Malik | |
| 7,176,923 B2 | 2/2007 | Vignet | |
| 7,404,194 B2 | 7/2008 | Wason et al. | |
| 7,454,439 B1 | 11/2008 | Gansner et al. | |
| 7,471,417 B1 | 12/2008 | Chien | |
| 7,734,607 B2 | 6/2010 | Grinstein et al. | |
| 7,765,182 B2 * | 7/2010 | Peurach et al. | 715/701 |
| 8,427,482 B2 | 4/2013 | Wallace et al. | |
| 2002/0199156 A1 * | 12/2002 | Chess et al. | 716/1 |

(Continued)

FOREIGN PATENT DOCUMENTS

| | | |
|---|---|---|
| WO | WO 2005/111873 A1 | 11/2005 |
| WO | WO 2010/126802 A2 | 11/2010 |
| WO | WO 2010/126803 A2 | 11/2010 |

OTHER PUBLICATIONS

Li et al., Texture Partitioning and Packing for Accelerating Texture-based Volume Rendering, Graphics Interface, 2003, vol. 81, pp. 1-10.*

(Continued)

*Primary Examiner* — M Good Johnson
(74) *Attorney, Agent, or Firm* — Merchant & Gould

(57) ABSTRACT

Data visualization platform optimization may be provided. Applications may provide data values and request creation of a visualization from a data visualization platform (DVP). The DVP may composite a plurality of geometry records associated with a subset of the visualization's data values. The application may render the visualization by iterating through the geometry vectors and translating a subset of the vectors into drawing instructions for output to a display device.

13 Claims, 3 Drawing Sheets

(56) References Cited

U.S. PATENT DOCUMENTS

| | | |
|---|---|---|
| 2003/0061309 A1 | 3/2003 | Brown et al. |
| 2003/0151604 A1* | 8/2003 | Kaufman et al. ............ 345/419 |
| 2003/0167278 A1 | 9/2003 | Baudel |
| 2004/0036712 A1 | 2/2004 | Cardno |
| 2004/0066384 A1 | 4/2004 | Ohba |
| 2004/0183811 A1 | 9/2004 | Qi et al. |
| 2004/0189668 A1 | 9/2004 | Beda et al. |
| 2004/0217956 A1 | 11/2004 | Besl et al. |
| 2004/0233193 A1* | 11/2004 | Margadant ................ 345/419 |
| 2005/0060300 A1 | 3/2005 | Stolte et al. |
| 2005/0183003 A1 | 8/2005 | Peri |
| 2006/0017724 A1 | 1/2006 | Tsao |
| 2006/0059414 A1 | 3/2006 | Cory et al. |
| 2006/0066621 A1 | 3/2006 | Herceg et al. |
| 2006/0202989 A1* | 9/2006 | Yinghui ...................... 345/424 |
| 2006/0236232 A1 | 10/2006 | Yuasa et al. |
| 2006/0285152 A1* | 12/2006 | Skillen ....................... 358/1.15 |
| 2007/0101322 A1 | 5/2007 | Muschett |
| 2007/0171716 A1 | 7/2007 | Wright et al. |
| 2007/0174762 A1 | 7/2007 | Plant |
| 2007/0188494 A1 | 8/2007 | Agutter et al. |
| 2007/0261100 A1 | 11/2007 | Greeson et al. |
| 2008/0172629 A1 | 7/2008 | Tien et al. |
| 2008/0180458 A1 | 7/2008 | Favart et al. |
| 2008/0288306 A1 | 11/2008 | MacIntyre et al. |
| 2008/0288889 A1 | 11/2008 | Hunt et al. |
| 2009/0019429 A1 | 1/2009 | Randow et al. |
| 2009/0073187 A1 | 3/2009 | Rampson et al. |
| 2009/0089453 A1 | 4/2009 | Bohan et al. |
| 2009/0254827 A1 | 10/2009 | Gonze et al. |
| 2010/0162152 A1 | 6/2010 | Allyn et al. |
| 2010/0257474 A1 | 10/2010 | Bochatay et al. |
| 2010/0281392 A1 | 11/2010 | Allyn et al. |
| 2010/0332994 A1 | 12/2010 | Istvan et al. |
| 2011/0015917 A1 | 1/2011 | Wang et al. |

OTHER PUBLICATIONS

Denkowski, M. et al., "Development of the Cross-Platform Framework for the Medical Image Processing," *Annales UMCS Informatica*, vol. AI 3, pp. 159-167 (2005).

Hill, B. et al., "An application Framework and Intelligent Graphic User Interface for Multiple Accelerator Codes," http://www.slac.stanford.edu/econf/C980914/papers/C-We21.pdf, 5 pages (1998).

Jern, M., "3D Data Visualization on the Web," *Proceedings of the 1998 Conference on MultiMedia Modeling*, pp. 90-99 (Oct. 12-15, 1998).

Millan, E. et al., "Imposters and pseudo-instancing for GPU crowd rendering," *GRAPHITE*, pp. 49-55 (2006).

NetCharts Server, *Visual Mining, Inc.*, http://www.visualmining.com/products_for_developers/NetCharts_Server.php, pp. 1-4 (Copyright 2009).

Rusinkiewicz, S. et al., "QSplat: A Multiresolution Point Rendering System for Large Meshes," *SIGGRAPH*, pp. 343-352 (2000).

U.S. Appl. No. 12/433,327, filed Apr. 30, 2009, entitled "Platform Extensibility Framework".

Xcelsius | XL, *Software Add-ons*, http://add-ons.co.uk/ product.aspx?name=Xcelsius%7CXL, pp. 1-3 (Copyright 2005).

International Search Report and The Written Opinion of the International Searching Authority, or the Declaration dated Nov. 30, 2010; 9 pages.

International Search Report and The Written Opinion of the International Searching Authority, or the Declaration dated Nov. 30, 2010 in PCT/US2010/032308 filed Apr. 23, 2010; 9 pages.

International Search Report and The Written Opinion of the International Searching Authority, or the Declaration dated Nov. 30, 2010 in PCT/US2010/032307 filed Apr. 23, 2010; 9 pages.

U.S. Official Action dated May 9, 2011 in U.S. Appl. No. 12/049,280.

U.S. Official Action dated Jun. 23, 2011 in U.S. Appl. No. 12/433,327.

Chinese Office Action dated Aug. 30, 2012 in Chinese Patent Application 201080019471.7 10 pages.

European Search Report dated Aug. 9, 2012 in European Application No. 10770165.8-1243/2425332 (PCT/US2010/032308), 5 pages.

U.S. Official Action dated May 4, 2012 in U.S. Appl. No. 12/049,280.

U.S. Official Action dated Oct. 12, 2011 in U.S. Appl. No. 12/049,280.

U.S. Official Action dated Dec. 7, 2011 for U.S. Appl. No. 12/433,327.

U.S. Official Action dated Oct. 10, 2012 for U.S. Appl. No. 12/049,280.

U.S. Official Action dated Jun. 11, 2013 for U.S. Appl. No. 12/049,280.

Chinese Office Action dated Jan. 31, 2013 in Application No. 201080019471.7, 8 pages.

Chinese Office Action dated May 23, 2013 in Application No. 201080019471.7, 8 pages.

Chilean Office Action dated Aug. 30, 2013 in Application No. 2655-2011, 11 pages.

U.S. Official Action dated Nov. 18, 2013 for U.S. Appl. No. 12/049,280, 14 pages.

* cited by examiner

DATA VISUALIZATION PLATFORM PERFORMANCE OPTIMIZATION

RELATED APPLICATIONS

Related U.S. patent application Ser. No. 12/433,327, filed on even date herewith and entitled "Platform Extensibility Framework," as well as related U.S. patent application Ser. No. 12/049,280, filed on Mar. 15, 2008, and entitled "Rendering Electronic Chart Objects," assigned to the assignee of the present application, are hereby incorporated by reference.

BACKGROUND

Data visualization platform performance optimizations provide improved performance in the generation of visual objects. In some situations, generating visual objects may be very performance intensive for a computer. For example, generating charts and maps may require a great deal of computational power and/or memory, especially when the object comprises a large number of data points. The conventional strategy is to render every data point, regardless of the size of the resulting object. This may cause problems because certain operations on the object may cause the computer to become sluggish to respond. For example, displaying a large map, selecting a portion of a detailed chart, scrolling, printing, and/or modifying the object may require a great deal of computing power and may cause the computer to respond slowly.

SUMMARY

Data visualization platform performance optimizations may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Data visualization platform optimization may be provided. Applications may provide data values and request creation of a visualization from a data visualization platform (DVP). The DVP may composite a plurality of geometry records associated with a subset of the visualization's data values. The application may render the visualization by iterating through the geometry vectors and translating a subset of the vectors into drawing instructions for output to a display device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
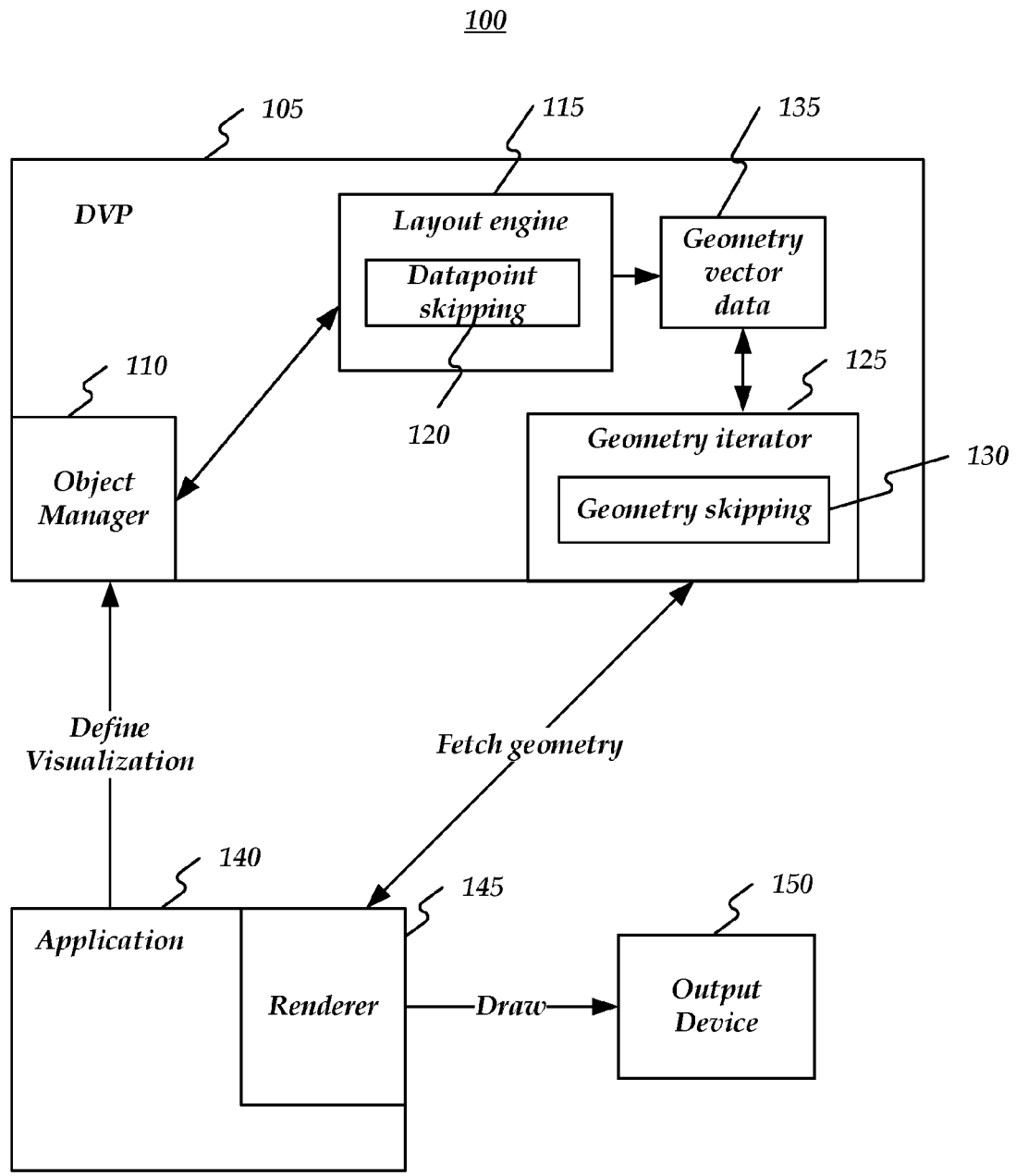
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Data visualization platform (DVP) performance optimization may be provided. Consistent with embodiments of the present invention, a DVP may skip datapoints during composition of an object according to a display resolution and may construct a minimal set of geometry vectors in memory. The DVP may also skip composed vectors during rendering of the object. The DVP may further allow scaling of the algorithms for skipping datapoints and/or vectors to expose different quality settings, such as by using an application programming interface (API) allowing control over settings such as maximum memory consumption, time, and/or datapoint counts.

FIG. 1 is a block diagram of an operating environment 100 for providing a visualization platform 105. Visualization platform 105 may comprise an object module 110, a layout engine 115, and a geometry iterator 125. Layout engine 115 may comprise a datapoint skipping algorithm 120. Geometry iterator 125 may comprise a geometry skipping algorithm 130. Geometry iterator 125 and layout engine 115 may create, update, read, retrieve, and/or provide a plurality of geometry vector data 135. Operating environment 100 may further comprise an application 140 comprising a renderer 145 operative to render drawing instructions to an output device 150 such as a monitor, screen, printer, and/or other display device. Visualization platform 105 may comprise an architecture allowing the creation of a data visualization, such as a chart, and may expose an interactive feature on the visualization. The architecture may provide integration with multiple rendering platforms. When a user selects the exposed feature, the architecture may translate the selection into a common format and modify the data visualization according to layout rules independent of the rendering platform.

Application 140 may define a visualization through object module 110. Object module 110 may call layout engine 115 that may build a collection of geometry records in memory as geometry vector data 135. Application 140 may later need to render the visualization and may call into geometry iterator 125 that may access geometry vector data 135 and return it to application 140. Application 140 may translate each geometry primitive in geometry vector data 135 into drawing instructions for rendering to output device 150.

Visualization platform 105 may comprise a shared core comprising software libraries and/or utilities for providing interactive visualizations. The shared core may be implemented, for example, in C++ or C#, and may be platform independent. The shared core may comprise visualization utilities for providing layouts, shapes and/or geometry, line services, 3-dimensional rendering, animation frame generation, and/or interactive hotspots. Visualization platform 110 may further comprise application programming interfaces (APIs) for interacting with application 140.

Two areas for performance optimization may be during the composition of geometry vector data 135 and translation of geometry vector data 135 into drawing instructions for rendering. For example, during composition of geometry vector data 135, memory usage may increase greatly as the amount of data increases. The amount of memory required may be reduced through the use of data point skipping algorithm 120 so as to composite geometry vectors for a subset of the data. Geometry skipping algorithm 130 may operate to reduce a number of drawing instructions required to be rendered by translating a subset of geometry vector data 135.

Figure 2:
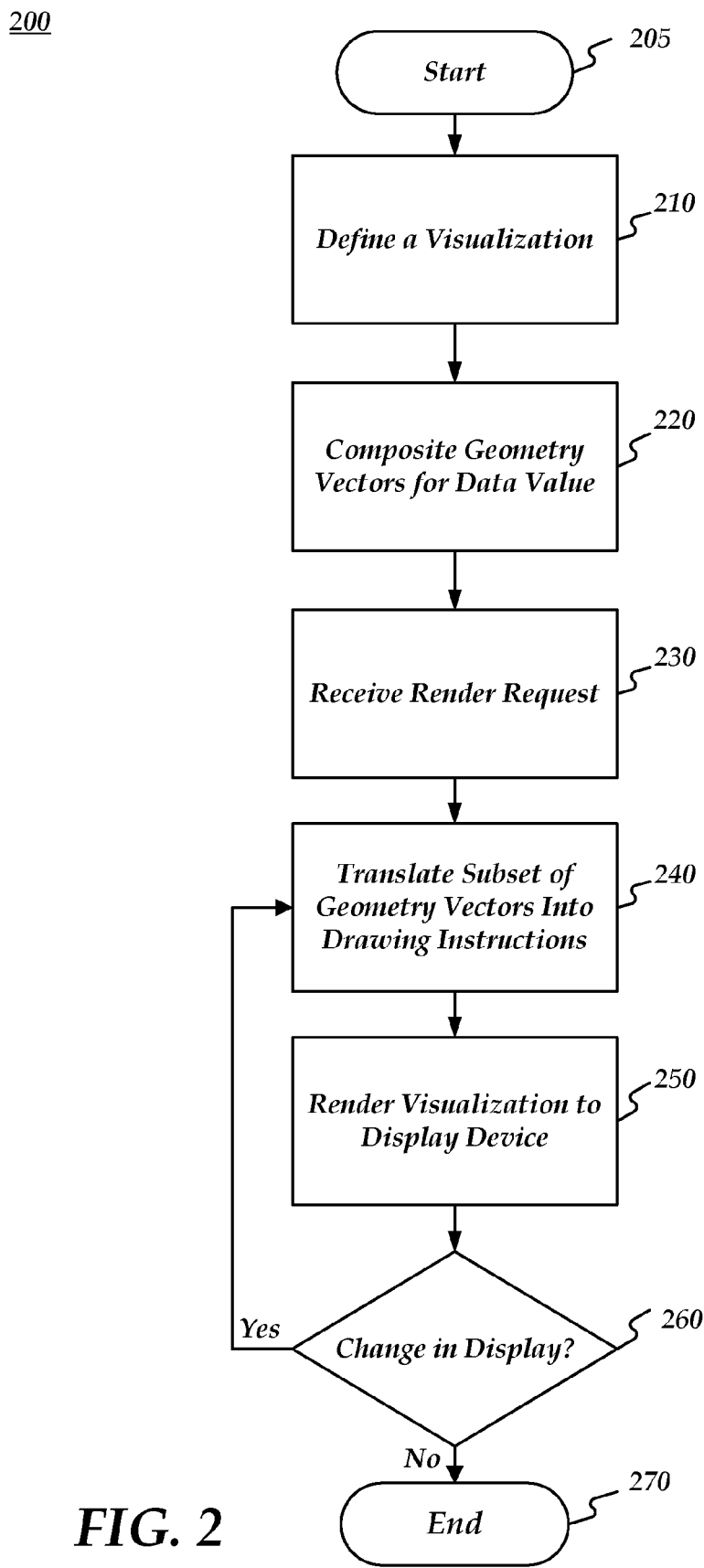
FIG. 2 is a flow chart of a method for optimizing visualization platform performance.

FIG. 2 is a flow chart setting forth the general stages involved in a method 200 consistent with an embodiment of the invention for providing data visualization platform optimizations. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may define a visualization. For example, application 140 may send a request to visualization platform 105 to create a visual object. The request may comprise a data value, a data series, and/or an object type such as a line chart, a bar chart, a pie chart, or a graph. Visualization platform 105 may use object manager to define a memory location for the visual object.

From stage 210 where computing device 300 defined the visualization, method 200 may advance to stage 220 where computing device 300 may composite at least one geometry vector associated with the visualization. For example, application 140 may define a visualization of a chart comprising 1,000 data points wherein each data point may be represented by an drawn octagonal shape. In conventional systems, visualization platform 105 may composite geometry vectors for each of the 1,000 data points. Consistent with embodiments of the invention, layout engine 115 may use datapoint skipping algorithm 120 to composite geometry vectors for a subset of the 1,000 data points. This may allow the display of a draft and/or preview quality visual object. Further consistent with embodiments of the invention, layout engine 115 may be operative to determine whether data points within the 1,000 data points are close enough to each other so as to be indistinguishable based on characteristics of application 140 and/or output device 150. For example, if a subset of 30 data points within the 1,000 data points all overlap or come within a predefined threshold of each other, such as within 5 pixels, datapoint skipping algorithm 120 may be operative to skip compositing all of the 30 data points and may only composite one of the 30 data points.

Consistent with embodiments of the invention, application 140 may define a column chart comprising 10,000 data points. Layout engine 115 may call a column series class that may walk through the data and composite vectors for boxes for the data points and put them into geometry vector data 135. Layout engine 115 may receive, from application 140 for example, a chart size in pixels and determine how many data points may be displayed in that size of the chart. For example, a chart 300 pixels wide may only be able to display 300 data points without overlapping. Layout engine 135 may thus composite vector data for a 300 point subset of the 10,000 data points. The size of the subset may be based, for example, on the resolution of output device 150.

The size of the subset may also be based, for example, on a determination by layout engine 115 that certain data points will be covered by other data points and layout engine 115 may thus skip compositing vector data for covered data points. Consistent with embodiments of the invention, layout engine 115 may determine that a later data point occupies the exact same pixel as a previous data point and thus the later data point may be skipped. Consistent with further embodiments of the invention, datapoint skipping algorithm 120 may use a configurable criterion to determine whether the later point is close enough to the previous data point to be skipped.

For example, layout engine 115 may set the criterion to skip data points within five pixels of a previous data point. Further consistent with embodiments of the invention, the criterion may be raised as the composition stage proceeds in order to limit the amount of memory consumed by the composition of geometry vector data 135. The criterion may also be received from application 140, such as through a user selection of a user interface throttle control.

Once computing device 300 composites the geometry vectors in stage 220, method 200 may continue to stage 230 where computing device 300 may receive a request to render the visualization. For example, application 140 may request rendering of the visualization according to a user command.

After computing device 300 receives the render request in stage 230, method 200 may proceed to stage 240 where computing device 300 may iterate through composited geometry vectors and translate them into drawing instructions. For example, visualization platform 105 may translate a geometry vector comprising an x-axis of a chart object into a drawing instruction for a line, wherein the drawing instruction comprises associated data such as a starting point for the line, an ending point for the line, a color for the line, and/or a width for the line.

Consistent with embodiments of the invention, visualization platform 105 may receive at least one supported drawing instruction from the application. Visualization platform 105 may be operative to translate the composited geometry vectors into the supported drawing instructions. For example, visualization platform 105 may be operative to linearize a geometry vector comprising an octagon into a drawing instructions comprising a start and end point for each of a set of eight lines used to render an octagonal shape on output device 150. Application 140 may instead or additionally inform visualization platform of a supported drawing instruction comprising a center point and a width for an octagon shape such that visualization platform 105 may translate the geometry vector comprising an octagon into the supported drawing instruction rather than linearizing the octagon shape. Application 140 may thus reduce the number of translated drawing instructions visualization platform 105 may need to provide.

Computing device 300 may utilize geometry skipping algorithm 130 to reduce the number of geometry vectors that need to be translated and rendered. For example, if the visualization comprises a chart of 100 pixels by 200 pixels using octagonal shapes for data points, each octagon may comprise a shape 10 pixels by 10 pixels or smaller and some line segments may comprise zero lengths. Geometry skipping algorithm 130 may, for example, determine that a particular geometry vector is associated with a criterion for being skipped, such as the vector may be translated into a drawing instruction for a line having the same start and end point. In such an example, geometry skipping algorithm 130 may skip over the particular geometry vector rather than translate it into a drawing instruction and sending it to application 140 for rendering. Geometry skipping algorithm 130 may skip one of the geometry vectors according to many other criteria such as a display size, a data type, a visualization type, a total number of data points, and a total number of geometry vectors.

Consistent with embodiments of the invention, application 140 may fetch the drawing instructions in batches. For example, application 140 may allocate enough memory to receive 50 of the drawing instructions. Visualization platform 105 may then provide 50 drawing instructions and inform application 140 whether more drawing instructions are waiting. Visualization platform 105 may wait for application 140 to request a subsequent batch and repeat the process.

From stage 240, method 200 may advance to stage 250 where computing device 300 may render the visualization to an output device. For example, application 140 may receive the drawing instructions at renderer 145 and draw the visualization on a screen comprising output device 150.

Once computing device 300 renders the visualization in stage 250, method 200 may advance to stage 260 where computing device 300 may determine whether a change has occurred in the display. For example, the displayed visualization may be moved, zoomed, re-sized, and/or obscured wholly or in part. If computing device determines that a change has occurred in the display of the visualization, method 300 may return to stage 250 where computing device 300 may re-render the visualization. Data point skipping may happen during composition at stage 220 when geometry vector data 135 is cached, while geometry skipping may happen each time the visualization is rendered in stage 250. So, for example, each time application 140 has to render the visualization, such as when a window is moved, minimized, maximized, or zoomed, application 140 may receive a new set of drawing instructions from geometry iterator 125. When application 140 zooms out, for example, fewer pixels may be displayed in the visualization and the geometry skipping may be more aggressive, skipping more geometry vectors.

Consistent with embodiments of the invention, data point skipping and geometry skipping may be used separately and/or together and may be controlled through a user exposed configuration preference. For example, a user wishing to zoom into great detail on a chart may disable data point skipping in order to provide the greatest amount of data while enabling geometry skipping to prevent the translation of vectors not visible in the zoomed in state.

Once computing device 300 has determined whether a change has occurred in the display at stage 260 and re-rendered the visualization if needed, method 200 may end at stage 270.

An embodiment consistent with the invention may comprise a system for providing visualization platform optimization. The system may comprise a memory storage and a processing unit coupled to the memory storage. The processing unit may be operative to define a visualization, create a plurality of geometry records, receive a request to display the visualization, iterate through the plurality of geometry vectors, translate at least one of the plurality of geometry records into at least one drawing instruction, and display the visualization on a display device.

Another embodiment consistent with the invention may comprise a system for providing visualization platform optimization. The system may comprise a memory storage and a processing unit coupled to the memory storage. The processing unit may be operative to create a visualization object associated with a plurality of data values, composite at least one first value of the plurality of data values into a geometry vector associated with the visualization object, and skip compositing at least one second value of the plurality of data values.

Yet another embodiment consistent with the invention may comprise a system for providing optimizing a visualization platform. The system may comprise a memory storage and a processing unit coupled to the memory storage. The processing unit may be operative to receive a request from a user application to create a visualization object, composite a plurality of geometry vectors associated with the visualization object, receive a render request from the user application, translate each of a subset of the plurality of geometry vectors into at least one drawing instruction, send the at least one drawing instruction associated with each of the subset of the plurality of geometry vectors to the user application and render the visualization object. The processing unit may be further operative to receive a second render request from the user application in response to a detected change affecting the rendered visualization object, translate each of a second subset of the plurality of geometry vectors into at least one drawing instruction, send the at least one drawing instruction associated with each of the second subset of the plurality of geometry vectors to the user application, and re-render the visualization object.

Figure 3:
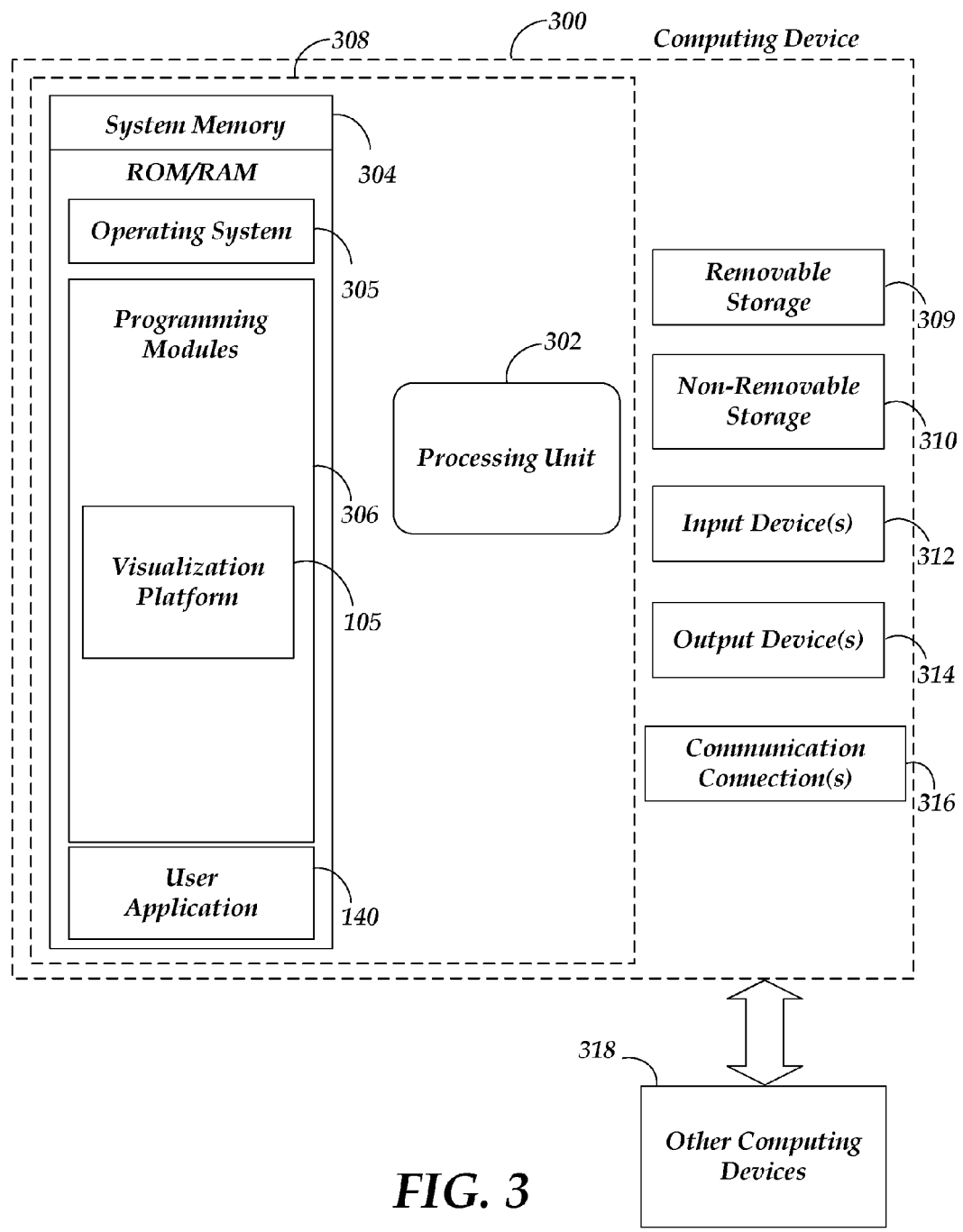
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include visualization platform 110. Operating system 305, for example, may be suitable for controlling computing device 300's operation. In one embodiment, programming modules 306 may include user application 140. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. user application 140) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing visualization platform optimization, the method comprising:
    defining a visualization;
    creating a plurality of geometry vectors;
    receiving a request to display the visualization;
    iterating through the plurality of geometry vectors;
    skipping at least one first vector of the plurality of geometry records according to a geometry skipping algorithm comprising at least one of the following criteria: a zero-length line detection, a total number of the plurality of geometry vectors, a total number of data points, a display size, a data type, and a visualization type;
    translating at least one second vector of the plurality of geometry records into at least one drawing instruction; and
    displaying the visualization on a display device.

2. The method of claim 1, further comprising:
    determining whether the at least one second vector of the plurality of geometry vectors comprises a pixel location associated with at least one third vector of the plurality of geometry vectors; and
    in response to determining that the at least one second vector of the plurality of geometry vectors comprises the pixel location associated with the at least one second vector of the plurality of geometry vectors, skipping the at least one second vector of the plurality of geometry vectors.

3. The method of claim 1, further comprising:
    sending a plurality of the translated geometry vectors to an application; and
    rendering the plurality of the translated geometry vectors for display by the application.

4. The method of claim 3, further comprising:
    receiving a request from the application for a batch of translated geometry vectors;
    sending a subset of the plurality of the translated geometry vectors to the application, wherein the subset of the plurality of the translated geometry vectors comprises a number of translated geometry records associated with the received batch request; and
    waiting to send a remaining subset of the plurality of translated geometry vectors.

5. The method of claim 1, wherein translating the at least one of the plurality of geometry vectors into the at least one drawing instruction comprises linearizing at least one of the plurality of geometry vectors.

6. The method of claim 1, further comprising:
    receiving at least one supported drawing instruction, wherein translating the at least one of the plurality of geometry vectors into the at least one drawing instruction comprises translating the at least one of the plurality of geometry vectors into the at least one supported drawing instruction.

7. A system for providing visualization platform optimization, the system comprising:
    a memory storage; and
    a processing unit coupled to the memory storage, wherein the processing unit is operative to:
        create a visualization object associated with a plurality of data values,
        composite at least one first value of the plurality of data values into a geometry vector associated with the visualization object,
        skip compositing at least one second value of the plurality of data values according to a predefined criterion, and
        translate at least a subset of the plurality of geometry vectors into a plurality of drawing instructions, wherein the subset of the plurality of geometry vectors is selected according to a geometry skipping algorithm comprising at least one of the following criteria: a zero-length line detection, a total number of the plurality of geometry vectors, a total number of data points, a display size, a data type, and a visualization type.

8. The system of claim 7, wherein the predefined criterion is user configurable.

9. The system of claim 7, wherein the geometry skipping algorithm is further operative to:
    translate at least one first vector of the plurality of geometry vectors into at least one drawing instruction,
    iterate to at least one second vector of the plurality of geometry vectors;
    determine whether the at least one second vector of the plurality of geometry vectors comprises a point on the visualization object proximate to the point on the visualization object associated with the at least one first vector; and
    in response to determining that the at least one second vector of the plurality of geometry vectors comprises the point on the visualization object proximate to the point on the visualization object associated with the at least one first vector, skip translating the at least one second vector into the at least one drawing instruction.

10. The system of claim 7, further operative to:
    receive at least one change to the visualization object; and
    in response to receiving the at least one change to the visualization object, re-rendering the visualization object.

11. The system of claim 10, wherein the at least one change to the visualization object comprises at least one of the following: a re-size of the visualization object, a zoom in on the visualization object, a zoom out on the visualization object, a movement of the visualization object, a partial covering of the visualization object, and a movement of an application.

12. The system of claim 7, further comprising a user application operative to render the visualization object to a display device.

13. A computer-readable medium which stores a set of instructions which when executed performs a method for optimizing a visualization platform, the method executed by the set of instructions comprising:
    receiving a request from a user application to create a visualization object, wherein the request comprises a plurality of data values and a visualization type and wherein the visualization object comprises a two-dimensional representation of a series of data points each comprising an associated value;
    compositing a plurality of geometry vectors associated with the visualization object, wherein compositing the plurality of geometry vectors comprises:
        compositing at least one geometry vector associated with at least one of the plurality of data values, and skipping at least one of the plurality of data values according to a criterion comprising at least one of the following: a display size, a data type, a total number of data points to be displayed, a total number of the plurality of geometry vectors, and a size of an amount of overlap between display objects;
receiving a render request from the user application;
translating each of a subset of the plurality of geometry vectors into at least one drawing instruction, wherein the subset of the plurality of geometry vectors is selected according to a geometry skipping algorithm comprising the criterion of at least one of the following: a zero-length line detection, the total number of the plurality of geometry vectors, the total number of data points, the display size, the data type, and the visualization type;
sending the at least one drawing instruction associated with each of the subset of the plurality of geometry vectors to the user application;
rendering the visualization object, wherein rendering the visualization object comprises rendering the at least one drawing instruction associated with each of the subset of the plurality of geometry vectors to a display device;
receiving a second render request from the user application in response to a detected change affecting the rendered visualization object;
translating each of a second subset of the plurality of geometry vectors into the at least one drawing instruction;
sending the at least one drawing instruction associated with each of the second subset of the plurality of geometry vectors to the user application; and
re-rendering the visualization object.

* * * * *